US008677589B2

(12) United States Patent
Ziekow et al.

(10) Patent No.: US 8,677,589 B2
(45) Date of Patent: Mar. 25, 2014

(54) DEVICE FOR THE LATERAL FITTING AND REMOVAL OF A COMPRESSOR BARREL

(75) Inventors: Christian Ziekow, Berlin (DE); Thomas Michligk, Berlin (DE)

(73) Assignee: MAN Diesel & Turbo SE, Augsburg (DE)

( * ) Notice: Subject to any disclaimer, the term of this patent is extended or adjusted under 35 U.S.C. 154(b) by 1253 days.

(21) Appl. No.: 12/084,168

(22) PCT Filed: Oct. 25, 2006

(86) PCT No.: PCT/EP2006/010256
§ 371 (c)(1),
(2), (4) Date: Jun. 12, 2008

(87) PCT Pub. No.: WO2007/048584
PCT Pub. Date: May 3, 2007

(65) Prior Publication Data
US 2009/0288291 A1 Nov. 26, 2009

(30) Foreign Application Priority Data
Oct. 28, 2005 (DE) .......................... 10 2005 052 077

(51) Int. Cl.
*B21K 25/00* (2006.01)
(52) U.S. Cl.
USPC ........................ 29/281.1; 29/889.2; 414/589
(58) Field of Classification Search
USPC ............... 29/281.1, 888.011; 415/126, 213.1; 269/17, 56, 95, 889.2; 414/589
See application file for complete search history.

(56) References Cited

U.S. PATENT DOCUMENTS

| 386,255 | A | * | 7/1888 | McCarty | 415/126 |
| 1,923,126 | A | * | 8/1933 | Tucker | 290/52 |
| 2,300,259 | A | * | 10/1942 | Kueppers | 206/319 |
| 3,022,740 | A | * | 2/1962 | Wilfley et al. | 415/126 |
| 3,140,821 | A | * | 7/1964 | Weckwert et al. | 417/348 |
| 3,150,820 | A | * | 9/1964 | Jekat et al. | 415/201 |
| 3,556,672 | A | * | 1/1971 | Gentile | 415/134 |

(Continued)

FOREIGN PATENT DOCUMENTS

| DE | 2719850 | 11/1978 |
| DE | 19617090 | 10/1997 |

(Continued)

OTHER PUBLICATIONS

Search Report dated Jan. 5, 2007 for the corresponding International PCT Application No. PCT/EP2006/010256.

*Primary Examiner* — Lee D Wilson
*Assistant Examiner* — Jamal Daniel
(74) *Attorney, Agent, or Firm* — Cozen O'Connor

(57) ABSTRACT

Apparatus for lateral fitting and removing of a compressor barrel into and out of a casing of a turbocompressor, the barrel having an inner core section with split disks which are bolted together coaxially, a cap rotatably mounted on a bearing block, and a rotor, wherein the disks are bolted to the cap and the rotor, and wherein the casing is vertically split and has a suction connection and a pressure connection. A support arm has a proximal end which can be releasably connected to the bearing block and a distal end which extends beyond the rotor and is displaceably supported on the casing when the proximal end is connected to the bearing block. A support device can be releasably mounted to the bearing block oppositely from the support arm, the supporting device being movable laterally on a guide to move the barrel into and out of the casing.

5 Claims, 1 Drawing Sheet

(56) References Cited

U.S. PATENT DOCUMENTS

| | | | |
|---|---|---|---|
| 3,837,164 A * | 9/1974 | Carr | 60/791 |
| 3,927,763 A * | 12/1975 | Strub et al. | 206/319 |
| 4,044,442 A * | 8/1977 | Carlson | 29/888.012 |
| 4,098,558 A * | 7/1978 | Bush et al. | 415/199.1 |
| 4,113,089 A * | 9/1978 | Bush et al. | 206/319 |
| 4,451,979 A * | 6/1984 | Schuster | 29/824 |
| 4,567,649 A * | 2/1986 | Ades et al. | 29/800 |
| 4,590,653 A * | 5/1986 | Ades et al. | 29/889.2 |
| 5,326,222 A * | 7/1994 | Matyscak et al. | 415/213.1 |
| 5,383,652 A * | 1/1995 | Van Den Berg | 269/17 |
| 5,575,607 A * | 11/1996 | Grout et al. | 414/589 |
| 5,816,367 A * | 10/1998 | Lilja et al. | 187/244 |
| 5,870,824 A * | 2/1999 | Lilja et al. | 29/889.1 |
| 5,971,702 A * | 10/1999 | Afton et al. | 415/126 |
| 6,170,141 B1 * | 1/2001 | Rossway et al. | 29/281.1 |
| 6,203,270 B1 * | 3/2001 | Magoshi | 415/126 |
| 6,224,332 B1 * | 5/2001 | Leach et al. | 415/126 |
| 6,279,309 B1 * | 8/2001 | Lawlor et al. | 60/772 |
| 6,292,999 B1 * | 9/2001 | Rossway et al. | 29/559 |
| 6,298,536 B1 * | 10/2001 | Rossway et al. | 29/281.1 |
| 7,559,280 B2 * | 7/2009 | Kalantari | 104/89 |
| 7,770,292 B2 * | 8/2010 | Stretton | 29/889.1 |
| 7,779,540 B2 * | 8/2010 | McCaffrey et al. | 29/889.2 |
| 7,976,266 B2 * | 7/2011 | Brown et al. | 415/1 |
| 8,061,737 B2 * | 11/2011 | Majot et al. | 285/45 |
| 2009/0064685 A1 * | 3/2009 | Busekros et al. | 60/797 |
| 2009/0288291 A1 * | 11/2009 | Ziekow et al. | 29/700 |

FOREIGN PATENT DOCUMENTS

| | | |
|---|---|---|
| DE | 29719605 | 12/1997 |
| DE | 19927765 | 12/2000 |
| GB | 2199461 | 7/1988 |
| JP | 10220399 | 8/1998 |

* cited by examiner

DEVICE FOR THE LATERAL FITTING AND REMOVAL OF A COMPRESSOR BARREL

CROSS-REFERENCE TO RELATED APPLICATIONS

This is a U.S. national stage of International Application No. PCT/EP2006/010256, filed on 25 Oct. 2006. Priority is claimed on German Application No. 10 2005 052 077.4, filed on 28 Oct. 2005.

BACKGROUND OF THE INVENTION

1. Field of the Invention

The invention concerns a device for the lateral mounting and dismounting of a compressor barrel of a turbocompressor into or out of a casing, which is vertically split, with wherein the barrel has an inner core section with split disks which are bolted together coaxially on a longitudinal axis, a cap rotatably mounted on a bearing block, and a rotor, wherein the disks are bolted to the cap and the rotor.

2. Description of the Related Art

The invention concerns a device for the lateral mounting and dismounting of a compressor barrel of a turbocompressor into or out of a casing, which is vertically split, with the features of the introductory clause of claim 1.

Turbocompressors with a vertically split casing are used especially for high gas pressures. The mounting devices that are already known in practice for turbocompressors with horizontal connections use a guide, which—guided from the drive side into the casing of the turbocompressor—maintains the complete compressor barrel in equilibrium in a horizontal position, while on the non-drive side there is axially sliding support relative to the base frame. The complete compressor barrel, which is supported in this way and consists of the inner core section with seals and the rotor supported in the bearings, is then axially mounted or dismounted.

Another mounting device uses an existing crane for maintaining the equilibrium instead of the support described above. In this regard, a cable is placed around the compressor barrel and held by the crane. This requires repeated resetting of the position of the cable with the risk of damage.

SUMMARY OF THE INVENTION

Both of the mounting devices described above presuppose that the complete compressor barrel is pulled. The above-described mounting devices cannot be used when the compressor barrel must be pulled incompletely, that is, without the drive-side bearing. In this case, the rotor is not supported on the drive side.

The objective of the invention is to create a device for mounting and dismounting a compressor barrel, in which the rotor is not unilaterally supported on the drive side by the already dismounted radial ball bearing and the rotor must be maintained in equilibrium during the mounting and dismounting.

In accordance with the invention, the mounting device includes a support arm having a proximal end which can be releasably connected to the bearing block and a distal end which extends beyond the rotor and is displaceably supported on the casing when the proximal end is connected to the bearing block; and a support device which can be releasably mounted to the bearing block oppositely from the support arm, the supporting device being movable laterally on a guide to move the barrel into and out of the casing.

With the aid of the supporting arm supported on the compressor casing and the supporting device connected with the bearing block, the compressor barrel can be maintained in equilibrium from one side, even if the rotor is not yet held or is no longer held on the other side in a radial ball bearing. This is advantageous especially when lateral guide rails for the mounting device cannot be mounted due to the horizontal position of the suction connection and the pressure connection on the compressor casing, and when, on the drive side of the turbocompressor, accessibility is limited by the structural design of the base forged onto the compressor casing.

DETAILED DESCRIPTION OF THE PREFERRED EMBODIMENTS

Figures 1, 2:
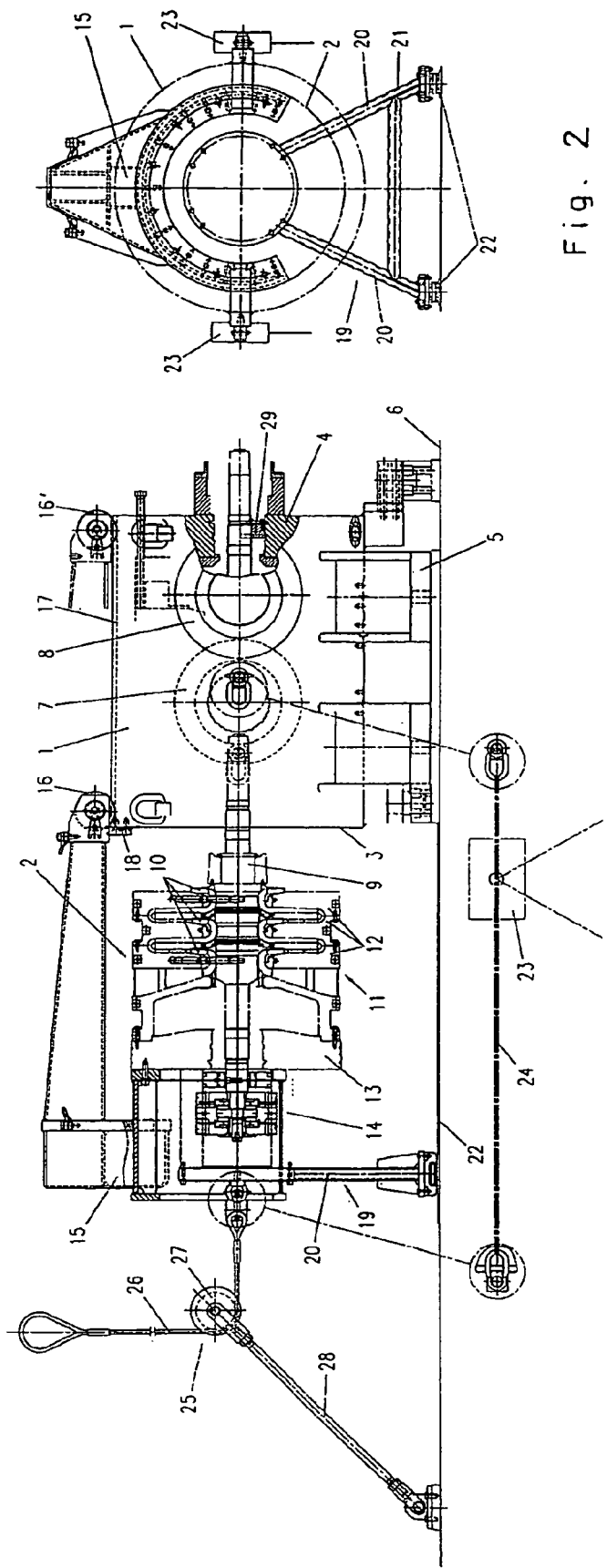
FIG. 1 shows a longitudinal section through a turbocompressor with a mounting/dismounting device.
FIG. 2 shows a side view of the turbocompressor shown in FIG. 1.

The drawings show a multistage turbocompressor with a vertically split casing 1 in a state in which the compressor barrel 2 is located outside the casing 1 immediately before mounting or immediately after dismounting.

The casing 1 of the turbocompressor has a vertical joint 3 and is unilaterally closed by a forged base 4 on one side. The compressor drive (not shown) is provided on this side of the turbocompressor. The base 4 holds a bearing for supporting the rotor 9, which will be described later. The casing 1 has casing feet 5 by which it rests on a base frame 6. A suction connection 7 and a pressure connection 8 are connected to the casing 1. In the illustrated embodiment, the two connections 7, 8 are located in the horizontal center plane of the casing 1. Depending on requirements, the two connections 7, 8 can also be arranged in the lower two thirds of the casing circumference in a position between the 2 o'clock position and the 10 o'clock position.

The compressor barrel 2 is shown as though it were already mounted for installation in the casing 1. It consists of a rotor 9 with a shaft and of impellers 10 mounted in a rotationally rigid way on the shaft. The rotor 9 is inserted in a stationary inner core section 11. This inner core section 11 consists of disks 12, which enclose the impellers 10 of the rotor 9 and define internal return channels between the impellers 10 and to the connections 7, 8. The individual disks 12 are horizontally split and bolted together. A cap 13 is bolted onto the first disk 12 of the compressor barrel 2. The compressor barrel 2 also comprises a bearing block 14 with bearings for supporting one end of the rotor 9.

A supporting arm 15 is releasably connected on the side with the cap 13 of the compressor barrel 2 for mounting or dismounting. The supporting arm 15 extends above the compressor barrel 2 in its longitudinal direction and is dimensioned sufficiently long that it projects beyond the inner core section 11. A roller 16 is mounted at the free end of the supporting arm 15. The roller 16 can roll along a track 17 to a position 16'. The track 17 is installed on the casing 1 of the turbocompressor above the suction connection 7 and the pressure connection 8. At the end of the track 17 that faces the supporting arm 15, a stop 18 is provided on the casing 1 to prevent the roller 16 from rolling back over the edge of the casing 1. The supporting arm 15 supports the compressor barrel 2 in such a way that it can be axially displaced on the casing 1.

A supporting device 19 is releasably connected with the bearing block 14 of the compressor barrel 2. The supporting device 19, which is shown in greater detail in FIG. 2, consists of two obliquely set supports 20, which are joined by a crossbar 21. Below each support 20 of the supporting device 19, there is a guideway 22, which supports the supporting device 19 and allows it to be displaced in the longitudinal direction of the compressor barrel 2.

A hoist 23 is mounted on either side of the turbocompressor. The flexible traction mechanism 24 of the hoist 23 is releasably connected with the supporting arm 15 at one end and with the casing 1 at the other end.

A tackle line 25 acts on the supporting device 19 for the purpose of dismounting. A cable 26 of this tackle line 25 is guided around a cable pulley 27 to a cable drive that is located outside the turbocompressor and is not shown in the drawings. The cable pulley 27 is rotatably supported in a hinged support 28 that is anchored on the base frame 6. The guidance of the cable 26 of the above-described tackle line 25 is selected in such a way that the segment of the cable 26 between the supporting device 19 and the deflection point of the cable around the cable pulley 27 lies in the longitudinal axis of the compressor barrel 2.

To prepare for mounting or to complete the dismounting, the compressor barrel 2 is mounted on a V-block in order to guarantee reliable support of the compressor barrel 2 during the attachment or detachment of the supporting arm 15 and the supporting device 19. Before being mounted in the casing 1, the compressor barrel 2 is oriented in such a way that its longitudinal axis comes into alignment with the extension of the longitudinal axis of the casing 1, that the end of the rotor 9 that faces away from the supporting arm 15 extends into the casing 1, and that the roller 16 sits on the track 17 on the casing 1 behind the stop 18. The supporting arm 15 and the supporting device 19 with the compressor barrel 2 are axially displaced by operation of the hoists 23 until the compressor barrel 2 occupies the intended position in the casing 1. During the insertion of the compressor barrel 2 into the casing 1, a temporary guide 29 inside the base 4 of the casing 1 provides reliable support of the rotor 9. The temporary guide is later replaced by a bearing. During dismounting, the compressor barrel 2 is pulled out by means of the tackle line 25.

What is claimed is:

1. An apparatus for lateral fitting and removing of a compressor barrel into and out of a casing of a turbocompressor, wherein the barrel comprises an inner core section having split disks which are bolted together coaxially on a longitudinal axis, a cap rotatably mounted on a bearing block, and a rotor, wherein the disks are bolted to the cap and the rotor, and wherein the casing is vertically split and has a suction connection and a pressure connection, the apparatus comprising:
    a support arm having a proximal end configured to be releasably connected to the bearing block and a distal end which extends beyond the rotor and is configured to be supported on the casing and axially displaced on the casing when the proximal end is connected to the bearing block;
    a support device which can be releasably mounted to the bearing block oppositely from the support arm, the support device configured to move laterally on a guide to move the barrel into and out of the casing; and
    a pair of hoists, each hoist having an end connected to the support arm and an end which can be connected to the casing, the hoists being situated on either side of the casing when the support arm is connected to the bearing block.

2. The apparatus of claim 1 further comprising a tackle line connected to the support device for pulling the support device parallel to the longitudinal axis.

3. An apparatus for lateral fitting and removing of a compressor barrel into and out of a casing of a turbocompressor, wherein the barrel comprises an inner core section having split disks which are bolted together coaxially on a longitudinal axis, a cap rotatably mounted on a bearing block, and a rotor, wherein the disks are bolted to the cap and the rotor, and wherein the casing is vertically split and has a suction connection and a pressure connection, the apparatus comprising:
    a support arm having a proximal end configured to be releasably connected to the bearing block and a distal end which extends beyond the rotor and is configured to be supported on the casing and axially displaced on the casing when the proximal end is connected to the bearing block;
    a support device which can be releasably mounted to the bearing block oppositely from the support arm, the support device configured to move laterally on a guide to move the barrel into and out of the casing; and
    a track mountable on the casing, wherein the distal end of the support arm carries a roller that is configured to run on the track when the track is mounted on the casing.

4. The apparatus of claim 3 wherein the track has a stop which limits the displacement of the support arm relative to the casing.

5. An apparatus for lateral fitting and removing of a compressor barrel into and out of a casing of a turbocompressor, wherein the barrel comprises an inner core section having split disks which are bolted together coaxially on a longitudinal axis, a cap rotatably mounted on a bearing block, and a rotor, wherein the disks are bolted to the cap and the rotor, and wherein the casing is vertically split and has a suction connection and a pressure connection, the apparatus comprising:
    a support arm having a proximal end configured to be releasably connected to the bearing block and a distal end which extends beyond the rotor and is configured to be supported on the casing and axially displaced on the casing when the proximal end is connected to the bearing block;
    a support device which can be releasably mounted to the bearing block oppositely from the support arm, the support device configured to move laterally on a guide to move the barrel into and out of the casing; and
    an alignment guide which can be installed in the casing temporarily as the compressor barrel is being fitted in the casing.

* * * * *